United States Patent
Jiang et al.

(10) Patent No.: US 10,244,536 B1
(45) Date of Patent: Mar. 26, 2019

(54) METHOD AND APPARATUS FOR DETERMINING WHETHER A SECONDARY CHANNEL IS IDLE

(71) Applicant: Marvell International Ltd., Hamilton (BM)

(72) Inventors: Jinjing Jiang, San Jose, CA (US); Liwen Chu, San Ramon, CA (US); Lei Wang, San Diego, CA (US); Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/692,979

(22) Filed: Aug. 31, 2017

Related U.S. Application Data

(60) Provisional application No. 62/381,896, filed on Aug. 31, 2016.

(51) Int. Cl.
*H04W 8/22* (2009.01)
*H04W 16/16* (2009.01)
(Continued)

(52) U.S. Cl.
CPC ......... *H04W 72/048* (2013.01); *H04W 24/08* (2013.01); *H04W 80/02* (2013.01); *H04W 84/12* (2013.01)

(58) Field of Classification Search
CPC .... H04W 8/22; H04W 74/0808; H04W 16/16
(Continued)

(56) References Cited

U.S. PATENT DOCUMENTS

| | | | | |
|---|---|---|---|---|
| 7,929,504 B2 * | 4/2011 | Wentink | ................. | H04W 8/22 370/338 |
| 7,953,053 B2 * | 5/2011 | Habetha | ................ | H04L 5/1438 370/337 |

(Continued)

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

(Continued)

*Primary Examiner* — William D Cumming

(57) ABSTRACT

In a method for determining whether a communication device can transmit via a first communication channel, the communication device receives a packet via a second communication channel and sets a network allocation vector (NAV) timer corresponding to the second communication channel using duration information included in the header of the packet. The communication device determines whether the second communication channel overlaps in frequency with a first communication channel. If the second communication channel overlaps the first communication channel, the communication device is not permitted to transmit via the first communication channel when the NAV timer is not zero. If the second communication channel does not overlap the first communication channel, the communication device is permitted to transmit via the second communication channel even when the NAV timer is not zero.

20 Claims, 9 Drawing Sheets

(51) Int. Cl.
*H04W 72/04* (2009.01)
*H04W 24/08* (2009.01)
*H04W 84/12* (2009.01)
*H04W 80/02* (2009.01)

(58) Field of Classification Search
USPC .......................... 455/450; 370/329, 337, 338
See application file for complete search history.

(56) References Cited

U.S. PATENT DOCUMENTS

| | | | | |
|---|---|---|---|---|
| 8,289,942 | B2* | 10/2012 | Habetha | H04L 5/1438 370/337 |
| 8,787,338 | B2 | 7/2014 | Liu et al. | |
| 9,253,799 | B2* | 2/2016 | Taori | H04W 74/0808 |
| 9,801,224 | B2* | 10/2017 | Taori | H04W 74/0808 |
| 9,980,268 | B2* | 5/2018 | Zhang | H04L 5/0041 |
| 10,075,873 | B2* | 9/2018 | Merlin | H04L 5/0053 |
| 2011/0194519 | A1* | 8/2011 | Habetha | H04L 5/1438 370/329 |
| 2013/0070745 | A1* | 3/2013 | Nixon | H04L 45/74 370/338 |
| 2014/0287769 | A1* | 9/2014 | Taori | H04W 74/0808 455/450 |
| 2016/0150587 | A1* | 5/2016 | Taori | H04W 74/0808 370/329 |
| 2016/0262050 | A1* | 9/2016 | Merlin | H04L 5/0053 |
| 2016/0353253 | A1* | 12/2016 | Cherian | H04L 5/0055 |
| 2017/0118725 | A1 | 4/2017 | Chu et al. | |
| 2017/0302422 | A1* | 10/2017 | Chu | H04L 5/0007 |
| 2018/0054762 | A1* | 2/2018 | Kadous | H04W 16/16 |
| 2018/0084554 | A1* | 3/2018 | Chu | H04L 5/0007 |
| 2018/0092092 | A1* | 3/2018 | Cariou | H04W 72/0453 |

OTHER PUBLICATIONS

IEEE Std 802.11ac™-2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-425 (Dec. 18, 2013).

IEEE Std 802.11ad™/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band the Institute of Electrical and Electronics Engineers, Inc., pp. 1-679 (Jul. 2012).

Park et al., "Efficient Multi-Channel Operation in 11 ay," LG Electronics, available at https://mentor.ieee.org/802.11/documents?is_dcn-LG&is_group=00ay, dated May 16, 2016 (11 pages).

* cited by examiner

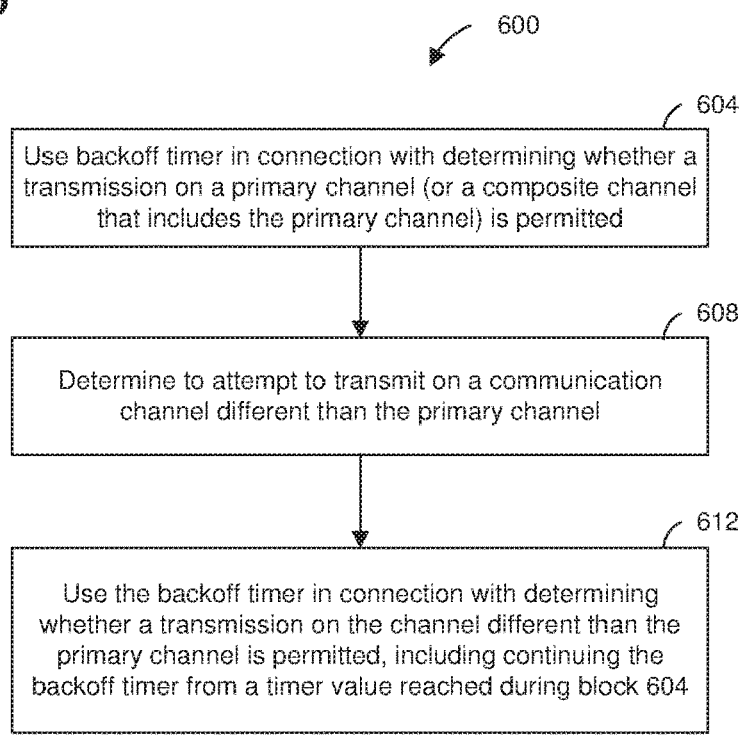
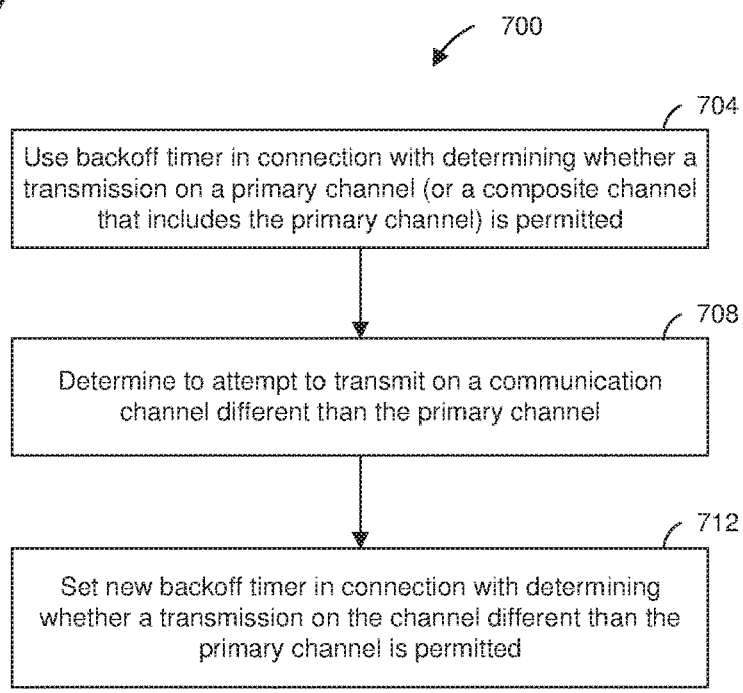

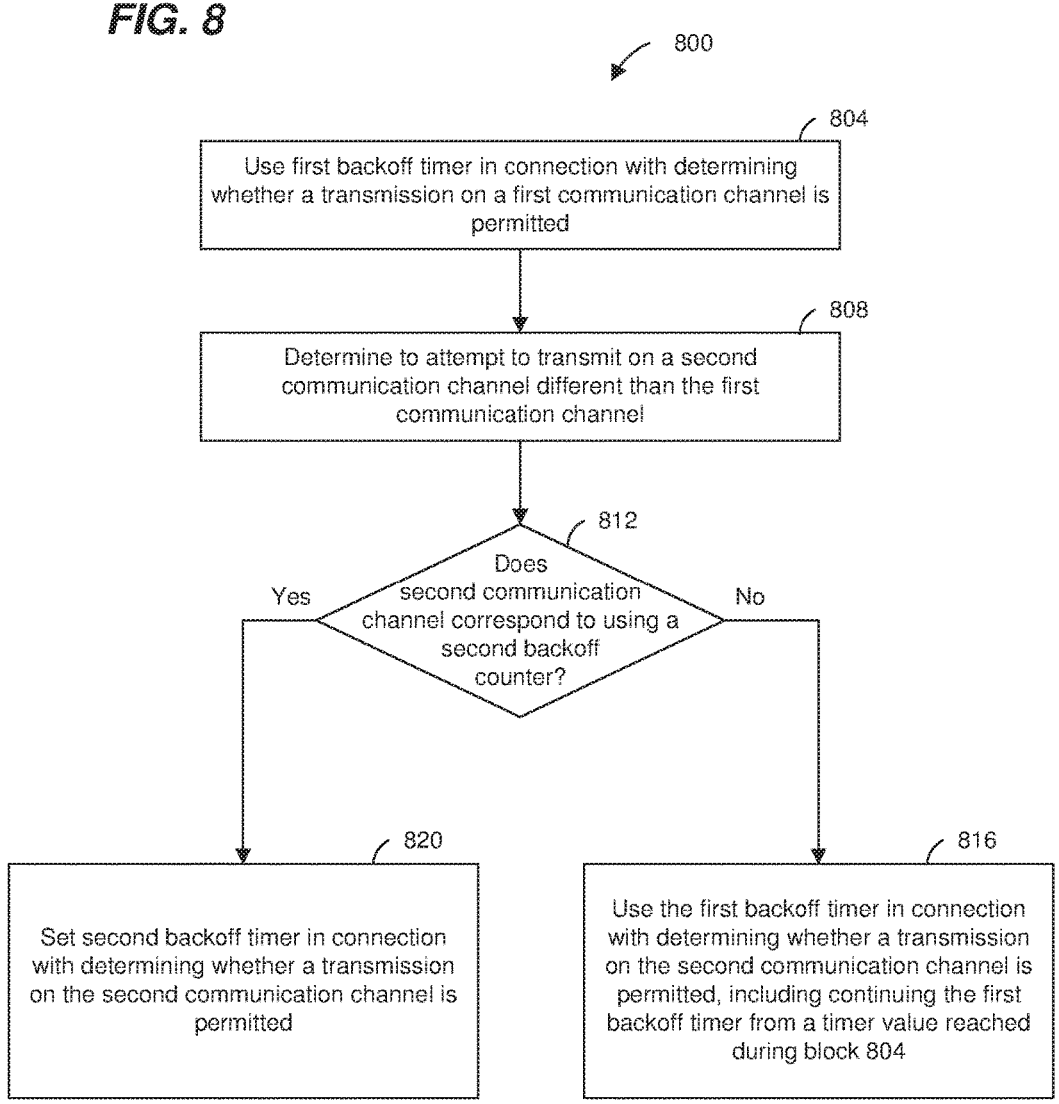

METHOD AND APPARATUS FOR DETERMINING WHETHER A SECONDARY CHANNEL IS IDLE

CROSS REFERENCES TO RELATED APPLICATIONS

This application claims the benefit of U.S. Provisional Patent App. No. 62/381,896, entitled "Secondary Channel Operation in 11ay," filed on Aug. 31, 2016, the disclosure of which is hereby expressly incorporated herein by reference in its entirety.

FIELD OF TECHNOLOGY

The present disclosure relates generally to wireless communication systems, and more particularly to techniques for determining whether a wireless communication channel is busy or idle.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11 ac Standard specifies a single-user peak throughput in the gigabits per second (Gbps) range. Future standards promise to provide even greater throughput, such as throughputs in the tens of Gbps range.

SUMMARY

In an embodiment, a method for determining whether a communication device is permitted to transmit via a first communication channel comprises: receiving, at a communication device, a first physical layer (PHY) data unit via a second communication channel, the first PHY data unit having a header; and setting, at the communication device, a network allocation vector (NAV) corresponding to the second communication channel, the NAV having a NAV timer. Setting the NAV includes setting the NAV timer using duration information included in the header of the first PHY data unit, wherein the NAV timer indicates whether another communication device is using a communication medium. The method also comprises determining, at the communication device, when the communication device is permitted to transmit via the first communication channel, including: determining, at the communication device, whether the second communication channel overlaps in frequency with the first communication channel, if the second communication channel overlaps the first communication channel, determining that the communication device is not permitted to transmit via the first communication channel in response to determining that the NAV timer is not zero, and if the second communication channel does not overlap the first communication channel, determining that the communication device is permitted to transmit via the second communication channel even when the NAV timer is not zero. The method further comprises transmitting, with the communication device, a second PHY data unit via the first communication channel in response to determining that the communication device is permitted to transmit via the first communication channel.

In another embodiment, an apparatus comprises a network interface device associated with a communication device. The network interface device includes: one or more integrated circuits (ICs), a media access control (MAC) processor implemented on the one or more ICs, and a physical layer (PHY) processor implemented on the one or more ICs. The MAC processor includes: a logic device configured to determine when the communication device is permitted to transmit via a first communication channel, and a network allocation vector (NAV) corresponding to a second communication channel, the NAV including a NAV timer that indicates whether another communication device is using a communication medium. The logic device is configured to: in response to the communication device receiving a first physical layer (PHY) data unit via the second communication channel, set the NAV corresponding to the second communication channel, including setting the NAV timer using duration information included in a header of the first PHY data unit. The logic device is also configured to: determine whether the second communication channel overlaps in frequency with the first communication channel, if the second communication channel overlaps the first communication channel, determine that the communication device is not permitted to transmit via the first communication channel in response to determining that the NAV timer is not zero, and if the second communication channel does not overlap the first communication channel, determine that the communication device is permitted to transmit via the second communication channel even when the NAV timer is not zero. The MAC processor is further configured to prompt the PHY processor to transmit a second PHY data unit via the first communication channel in response to determining that the communication device is permitted to transmit via the first communication channel.

BRIEF DESCRIPTION OF THE DRAWINGS

FIG. 6 is a flow diagram of an example method for performing a backoff operation, according to an embodiment.

FIG. 7 is a flow diagram of another example method for performing a backoff operation, according to another embodiment.

FIG. 8 is a flow diagram of still another example method for performing a backoff operation, according to another embodiment.

DETAILED DESCRIPTION

Techniques described below for determining whether a communication channel is busy or idle are discussed in the context of wireless local area networks (WLANs) that utilize protocols related to protocols defined by the 802.11 Standard from the Institute of Electrical and Electronics Engineers (IEEE) merely for explanatory purposes. In other embodiments, however, clock drift mitigation techniques are utilized in other types of communication systems such as non-IEEE 802.11 WLANs, personal area networks (PANs), mobile communication networks such as cellular networks, metropolitan area networks (MANs), satellite communication networks, etc.

Figure 1:
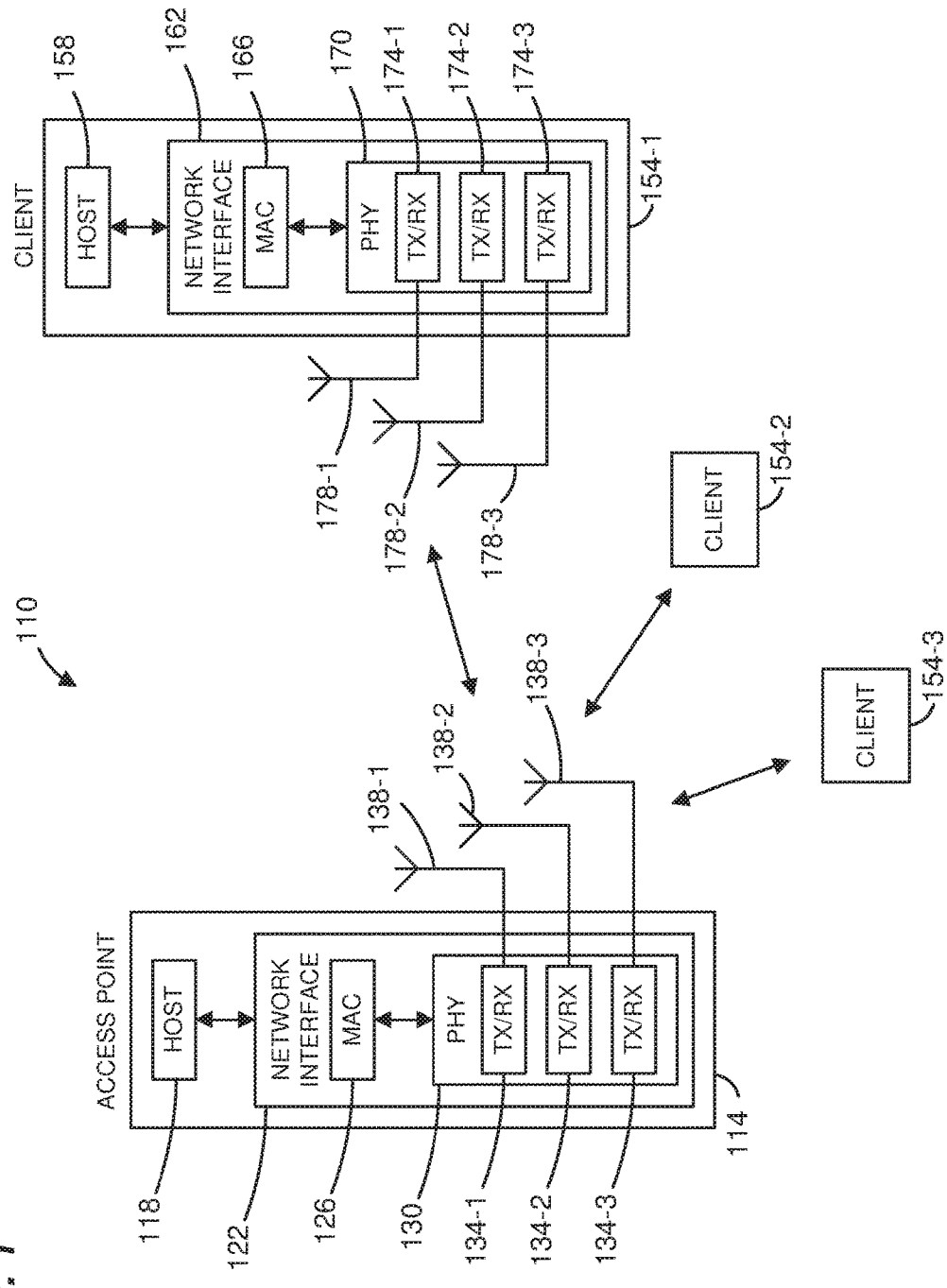
FIG. 1 is a block diagram of an example wireless local area network (WLAN), according to an embodiment.

FIG. 1 is a block diagram of an example WLAN 110, according to an embodiment. In an embodiment, the WLAN 110 operates according to a communication protocol that utilizes a plurality of communication channels, including a primary channel and multiple secondary channels. The current IEEE 802.11 Standard protocols generally require that, when multiple channels are used in a WLAN system, all of the channels must overlap the primary channel. Future WLAN protocols, however, may permit the use of communication channels that do not overlap with the primary channel and may permit the simultaneous use of different channels for scheduled access and/or contention based access by client stations. Embodiments of techniques for determining whether a communication channel is busy or idle, and of techniques for announcing operation on channels that do not overlap with the primary channel are discussed below. Such techniques may be useful in a system that permits the use of communication channels that do not overlap with the primary channel, and/or permits the simultaneous use of different channels for contention based access.

The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized. The PHY processor 130 includes circuitry, coupled to the antennas 138, that is configured to upconvert baseband signals to radio frequency (RF) signals for transmission via the antennas 138. The PHY processor 130 also includes circuitry, coupled to the antennas 138, that is configured to downconvert RF signals received via the antennas 138 to baseband signals.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. The PHY processor 130 may be configured to cause the AP 114 to transmit a signal by providing a baseband signal that includes a PPDU to the circuitry configured to upconvert baseband signals to RF signals. The circuitry configured to upconvert baseband signals to RF signals responsively provides the RF signal that includes the PPDU to the antennas 138.

Similarly, the PHY processor 130 may be configured to receive PHY data units that were received via the antennas 138, and extract MAC layer data units encapsulated within the PHY data units. For example, the circuitry configured to downconvert RF signals to baseband signals may output a baseband signal that includes a received PPDU, and the PHY processor 130 may extract one or more MAC layer data units encapsulated in the PPDU. The PHY processor 130 may provide the extracted MAC layer data units to the MAC processor 126, which processes the MAC layer data units.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized. The PHY processor 170 includes circuitry, coupled to the antennas 178, that is configured to upconvert baseband signals to RF signals for transmission via the antennas 178. The PHY processor 170 also includes circuitry, coupled to the antennas 178, that is configured to downconvert RF signals received via the antennas 178 to baseband signals.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. The PHY processor 170 may be configured to cause the client station 154-1 to transmit a signal by providing a baseband signal that includes a PPDU to the circuitry configured to upconvert baseband signals to RF signals. The circuitry configured to upconvert baseband signals to RF signals responsively provides the RF signal that includes the PPDU to the antennas 178.

Similarly, the PHY processor 170 may be configured to receive PHY data units that were received via the antennas 178, and extract MAC layer data units encapsulated within the PHY data units. For example, the circuitry configured to downconvert RF signals to baseband signals may output a baseband signal that includes a received PPDU, and the PHY processor 170 may extract one or more MAC layer data units encapsulated in the PPDU. The PHY processor 170 may provide the extracted MAC layer data units to the MAC processor 166, which processes the MAC layer data units.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, the AP 114 and one or more of the client stations 154 are configured to transmit and receive via different communication frequency bandwidths. For example, the AP 114 and the client stations 154 operate according to a communication protocol that defines multiple component communication channels (e.g., a primary channel and one or more secondary channels) each having a fixed bandwidth, according to an embodiment. Multiple communication channels can be aggregated to form a composite channel, and different channel bandwidths can be achieved by aggregating different numbers of component channels, according to an embodiment. In some embodiments, the AP 114 and one or more of the client stations 154 operate according to a communication protocol that defines a primary channel and one or more secondary channels, and permits the use of communication channels that do not overlap the primary channel. In some embodiments, the communication protocol permits simultaneous use of different channels for scheduled access and/or contention based access by the client stations 154-1.

In an embodiment, the AP 114 and the client stations 154 contend for a communication medium using carrier sense multiple access with collision avoidance (CSMA/CA) protocol or another suitable medium access protocol. In an embodiment, the AP 114 and the client stations 154 maintain respective network allocation vectors (NAVs) that include timers for tracking when another communication device has seized control or "ownership" of a wireless communication medium. For example, when a communication device (e.g., the AP 114 or a client station 154) receives a transmitted PHY data unit that conforms to a particular communication protocol (e.g., the IEEE 802.11 Standard, a future version of the IEEE 802.11 Standard, or another suitable communication protocol), the communication device examines duration information included in a header of the PHY data unit, where the duration information indicates a length of time that another communication device has taken ownership of a communication medium. The communication device then uses the duration information in the PHY data unit to set a NAV timer, and the NAV timer begins to decrement. When a value of the NAV timer is non-zero, this indicates that another communication device owns the communication medium and that the communication device therefore should generally refrain from transmitting. On the other hand, when the value of the NAV timer reaches zero, this indicates that the communication medium is not currently owned by another communication device.

In an embodiment, the communication device (e.g., the AP 114 and the client stations 154) employs a clear channel assessment (CCA) procedure when the NAV is zero. In the CCA procedure, the communication device (e.g., an AP 114, a client station 154) determines an energy level of the medium in order to determine whether the medium is busy or idle. While the communication device determines that the medium is idle, the communication device decrements a backoff timer. When the communication device determines that the communication medium is busy, the communication device pauses the backoff timer and does not resume decrementing the backoff timer until the communication medium is subsequently determined to be idle. The backoff timer is set to a value chosen randomly or pseudo-randomly so that backoff timers of different communication devices in the network tend to reach zero at different times. Generally, if the communication medium is still idle when the backoff timer reaches zero, the communication device determines that the communication device is free to transmit. On the other hand, if the communication medium is busy when the backoff timer reaches zero, the communication device resets the backoff timer and the process repeats.

Any suitable threshold energy level may be utilized. The threshold energy level for determining whether the medium is idle or busy may be different depending on the bandwidth of the channel being used by the communication device and/or on whether the energy corresponds to a transmission that conforms to a wireless communication protocol, according to some embodiments. For example, in the communication protocol defined by the IEEE 802.11 Standard, if the channel bandwidth is 20 Megahertz (MHz), the threshold level is −82 decibel-milliwatts (dBm) for energy from transmissions that conform to the IEEE 802.11 Standard (referred to as "valid 802.11" signals). For channel bandwidths of 40 MHz, 80 MHz, and 160 MHz, the threshold levels are −79 dBm, −76 dBm, and −73 dBm, respectively. For energy of signals not identified by the communication device as a valid 802.11 signal, the threshold level is −62 dBm, according to the IEEE 802.11 Standard.

As discussed above, the WLAN 110 uses multiple communication channels (e.g., a primary channel and one or more secondary channels), according to an embodiment. In illustrative embodiments discussed below, the WLAN 110 uses four communication channels (e.g., one primary channel and three secondary channels). In other embodiments, however, the WLAN 110 utilizes other suitable numbers of communication channels (e.g., two, three, five, six, seven, etc.). In some embodiments, different simultaneous transmissions in the WLAN 110 are permitted on different sets of one or more channels. As an illustrative example, in an embodiment, the client station 154-1 is permitted to transmit on a third channel while the AP 114 or another client station 154 is transmitting on a first channel and a second channel (e.g., aggregated together to form a composite channel).

In a communication system that uses multiple communication channels and in which different simultaneous communications are permitted on different communication channels, determining whether a particular communication channel is idle is more complicated as compared to a system in which such different simultaneous communications on different communication channels is not permitted. Example techniques, according to some embodiments, for determining whether a particular communication channel is idle in a system such as the WLAN 110 are described below.

In some embodiments in which one of the channels is designated a primary channel, the AP 114 grants permission to clients stations 154 to access one or more of the secondary channels (or allocates one or more secondary channels to a client station 154), where the access does not also use the primary channel. In some embodiments, associated with granting permission to access one or more secondary channels for use without the primary channel, the AP 114 designates one of the one or more secondary channels as an alternate primary channel. In some embodiments, a communication protocol defines which secondary channel serves as an alternate primary channel when a communication device uses one or more secondary channels without using the primary channel.

In some embodiments, the AP 114 indicates granting of access to client stations 154 to secondary channels using a secondary channel announcement, which is discussed in more detail below.

Figure 2:
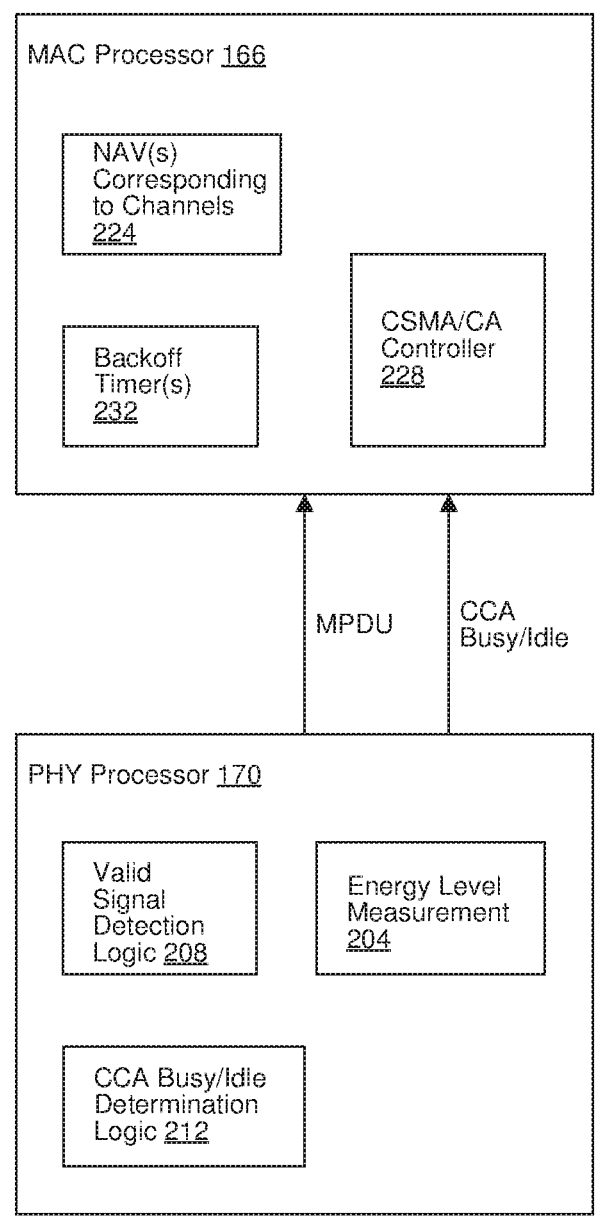
FIG. 2 is a block diagram of carrier sense multiple access with collision avoidance (CSMA/CA)-related and clear channel assessment (CCA)-related components of a client station of FIG. 1, according to an embodiment.

FIG. 2 is a block diagram illustrating CSMA/CA- and CCA-related components of the MAC processor 166 and the PHY processor 170 of the client station 154-1, according to an embodiment. The CSMA/CA- and CCA-related components are used for determining whether a particular communication channel is idle in a system such as the WLAN 110, according to some embodiments. In some embodiments, the MAC processor 126 and the PHY processor 130 of the AP 114 include the same or similar CSMA/CA- and CCA-related components.

The PHY processor 170 includes an energy level measurement circuit 204 configured to measure an energy level of the communication medium. The PHY processor 170 also includes a logic device 208 configured to detect whether a received signal is a signal that conforms to a wireless communication protocol (e.g., is a valid 802.11 signal). In an embodiment, the logic device 208 is configured to detect whether a received signal includes a PHY preamble and/or PHY header that conforms to the wireless communication protocol (e.g., a protocol that conforms to the IEEE 802.11 Standard, a protocol that conforms to a version of the IEEE 802.11 Standard not yet approved, or another suitable wireless communication protocol). In an embodiment, determining whether a PHY header in a received signal conforms to the wireless communication protocol includes one or both of i) determining whether at least a portion of the PHY header has a format that conforms to the wireless communication protocol, and ii) determining whether at least a portion of the PHY header includes data that is valid according to the wireless communication protocol. In an embodiment, the logic device 208 comprises a hardware state machine circuit and/or a processor executing machine readable instructions.

The PHY processor 170 also includes a logic device 212 configured to determine whether the communication medium is i) idle or ii) busy. For example, in an embodiment, the logic device 212 is configured to compare the energy level of the channel medium, as measured by the circuit 204, to an energy level threshold to determine whether the communication medium is i) idle or ii) busy. If the measured energy level is above the threshold, the logic device 212 determines that the channel medium is busy, and if the measured energy level is below the threshold, the logic device 212 determines that the channel medium is idle. In some embodiments, the energy level threshold used by the logic device 212 varies depending on, for example, i) whether there is a valid 802.11 signal detected by the logic device 208, ii) a bandwidth of a channel that is being monitored, etc. For signals that are not valid 802.11 signals, the logic device 212 uses a suitable first energy level threshold, according to some embodiments. For signals that are valid 802.11 signals, the logic device 212 uses a suitable second energy level threshold, according to some embodiments, where the second energy level threshold is higher than the first energy level threshold. In an embodiment, the logic device 212 comprises a hardware state machine circuit and/or a processor executing machine readable instructions.

The PHY processor 170 is configured to generate an indication of whether the channel medium is busy or idle (e.g., a CCA busy/idle signal), and provide the indication to the MAC processor 166. For example, in an embodiment, the logic device 212 is configured to generate the CCA busy/idle signal.

The MAC processor 166 includes one or more NAVs 224 that include one or more respective timers and that correspond to one or more channels. For example, in a communication system that utilizes multiple communication channels, when the AP 114 receives a PHY data unit via a particular channel, the MAC processor 166 uses duration information included in the PHY data unit to set a NAV timer corresponding to the particular channel. The NAV timer then decrements over time such that the NAV timer reaches zero after a time period that corresponds to the duration information included in the PHY data unit. In an embodiment, different NAV timers are associated with different channels. As will be discussed in more detail below, NAV timers corresponding to different channels are useful for the MAC processor 166 to determine whether a particular channel, among a set of multiple communication channels, can be used for a transmission, according to some embodiments. In some embodiments, however, the NAV 224 does not correspond to any particular channel but rather is used for all channels.

In an embodiment, each NAV 224 includes a counter circuit for implementing the NAV timer. In an embodiment, the MAC processor 166 is configured to use respective NAV timers for respective channels. In an embodiment, a memory (e.g., one or more registers, one or more locations in a memory device (e.g., a random access memory (RAM), a flash memory, etc.) in or coupled to the MAC processor 166 stores information that indicates which NAV 224 corresponds to which channel. In an embodiment, each NAV 224 includes a memory (e.g., one or more registers, one or more locations in a memory device (e.g., a random access memory (RAM), a flash memory, etc.), etc.) for storing a channel parameter that indicates the channel to which the NAV 224 corresponds. In an embodiment in which a single NAV 224 is used, the memory for storing a channel parameter may be omitted.

The MAC processor 166 also includes a CSMA/CA controller 228 configured to control one or more backoff timers 232 and to use the NAV(s) 224 and the backoff timer(s) 232 and to determine when the client station 154-1 is permitted to transmit in a particular channel, as will described in more detail below.

According to an embodiment, when the client station 154-1 has data to transmit via a particular channel, the controller 228 determines whether there is a non-zero NAV timer corresponding to a channel that overlaps the particular channel. If the controller 228 determines there is a non-zero NAV timer corresponding to a channel that overlaps the particular channel, the client station 154-1 is not permitted to transmit. On the other hand, if the controller 228 determines there is not a non-zero NAV timer corresponding to a channel that overlaps the particular channel, the controller 228 utilizes a backoff process to determine if and when the client station 154-1 can transmit.

For example, in an embodiment, the backoff process includes setting a backoff timer 232 and then checking the CCA busy/idle signal during each of a plurality of time slots. When the CCA busy/idle indicates the channel is idle during a particular time slot, the controller 228 decrements the backoff timer 232. On the other hand, when the CCA busy/idle indicates the channel is busy during a particular time slot, the controller 228 does not decrement the backoff timer 232. When i) the backoff timer 232 is zero, ii) the channel is idle, and iii) there is not a non-zero NAV timer associated with a channel that overlaps the particular channel, the controller 228 determines that the client station 154-1 is permitted to transmit, according to an embodiment. On the other hand, when the backoff timer 232 reaches zero and the controller 228 determines that the channel is busy, the controller 228 resets the backoff timer 232 and the backoff procedure repeats, according to an embodiment.

In an embodiment, each backoff timer 232 includes a counter circuit. In an embodiment, the controller 228 comprises a hardware state machine circuit, a logic circuit, and/or a processor executing machine readable instructions.

Figure 3:
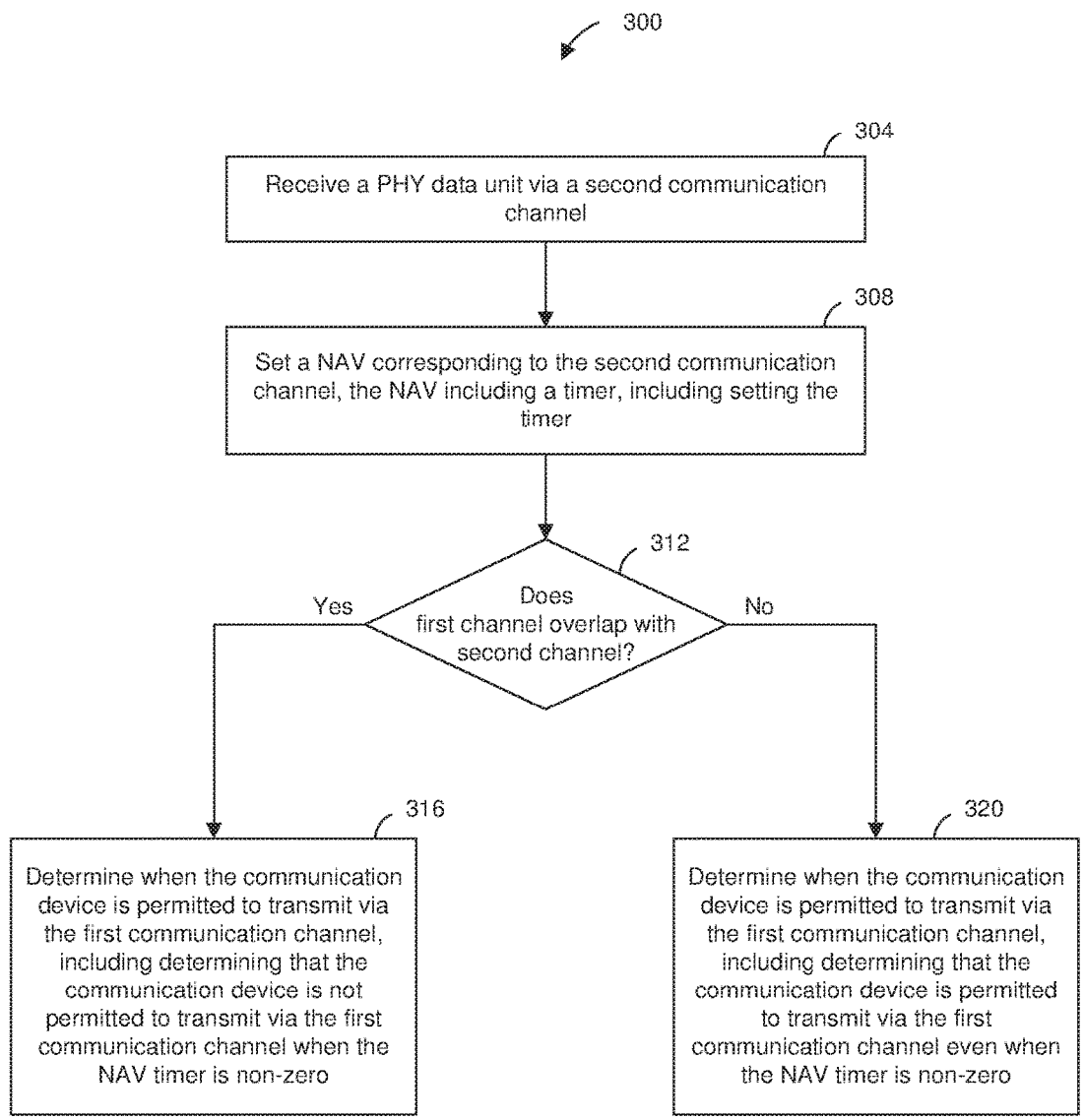
FIG. 3 is a flow diagram of an example method for determining when a communication device can transmit via a communication channel, according to an embodiment.

FIG. 3 is a flow diagram of an example method 300 of determining when a communication can transmit via a first communication channel, according to an embodiment. In an embodiment, the method 300 is implemented by the network interface device 162 (FIG. 1) and uses CSMA/CA- and CCA-related components illustrated in FIG. 2. Thus, the method 300 is described with reference to FIGS. 1 and 2 for ease of explanation. In other embodiments, however, the method 300 is implemented by another suitable network interface device. Similarly, in some embodiments, the network interface device 162 (FIG. 1) and the CSMA/CA- and CCA-related components illustrated in FIG. 2 do not implement the method 300.

In an embodiment, the first communication channel is a secondary channel. In another embodiment, the first communication channel is a composite channel that includes at least one secondary channel (e.g., the composite channel includes a primary channel and one or more secondary channels, the composite channel includes two or more secondary channels, etc.).

At block 304, a PHY data unit is received by a communication device (e.g., the client station 154-1 or another suitable communication device) via a second communication channel. For example, the network interface device 162 receives the PHY data unit via the antenna(s) 178. In an embodiment, the second communication channel is a primary channel or a secondary channel. In another embodiment, the second communication channel is a composite channel that includes at least one secondary channel (e.g., the composite channel includes a primary channel and one or more secondary channels, the composite channel includes two or more secondary channels, etc.).

At block 308, the network interface device 162 sets a NAV in connection with receiving the PHY data unit at block 304, where the NAV indicates that another communication device is using a communication medium. In an embodiment, block 308 includes setting a timer of the NAV using duration information included in a field of a header of the PHY data unit. In an embodiment, the duration information in the header of the PHY data unit indicates a length of time that the communication medium is expected to be used. In an embodiment, block 308 includes determining which NAV corresponds to the second communication channel and setting the timer of the determined NAV. In another embodiment, block 308 includes setting a channel parameter of the NAV to indicate the second communication channel. In an embodiment, block 308 includes the controller 228 setting a NAV 224.

At block 312, the network interface device 162 determines whether the first communication channel (e.g., which corresponds to a communication channel via which the network interface device 162 intends to transmit) overlaps in frequency with the second communication channel (i.e., the channel via which the PHY data unit was received at block 304). If the network interface device 162 determines that the first communication channel overlaps in frequency with the second communication channel, the flow proceeds to block 316.

At block 316, the network interface device 162 determines when the communication device is permitted to transmit via the first communication channel, including determining that the communication device is not permitted to transmit via the first communication channel when the NAV timer is non-zero. Block 316 includes using a backoff procedure such as described herein or another suitable backoff procedure, according to some embodiments. For example, in an embodiment, uses the backoff procedure when the NAV time reaches zero.

On the other hand, if the network interface device 162 determines, at block 312, that the first communication channel does not overlap in frequency with the second communication channel, the flow proceeds to block 320. At block 320, the network interface device 162 determines when the communication device is permitted to transmit via the first communication channel, including determining that the communication device is permitted to transmit via the first communication channel even when the NAV timer is non-zero. In embodiments that utilize multiple NAVs 224, block 320 may include determining whether there are any other non-zero NAV timers corresponding to channels that overlap in frequency with the first communication channel, and determining that the communication device is not permitted to transmit via the first communication channel when there is any non-zero NAV timer corresponding to channels that overlap in frequency with the first communication channel. Block 320 includes using a backoff procedure such as described herein or another suitable backoff procedure, according to some embodiments.

In some embodiments, when the network interface device 162 determines that the communication device is permitted to transmit via the first communication channel, the network interface device generates a transmission signal and provides the transmission signal to the antenna(s) 178. The transmission signal corresponds to a PHY data unit generated by the network interface device 162.

Figure 4:
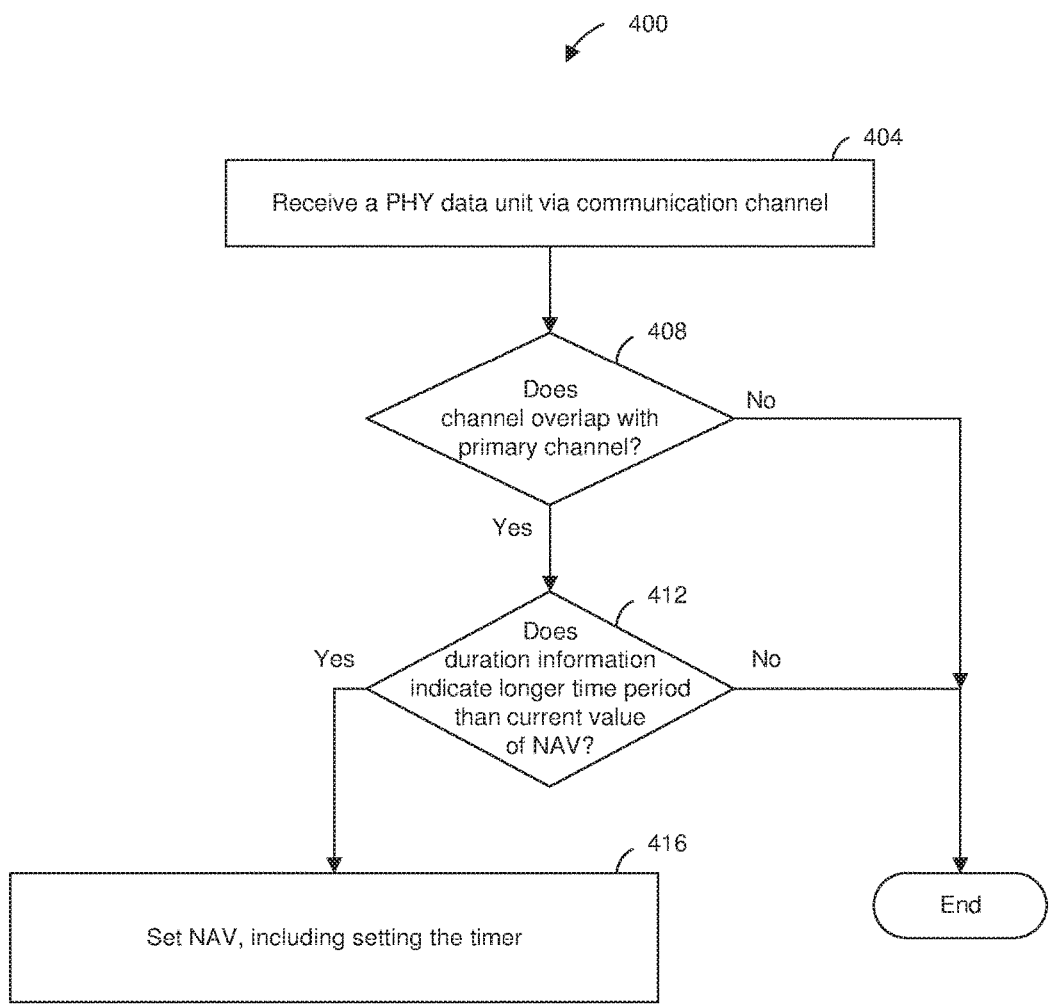
FIG. 4 is a flow diagram of an example method for setting a network allocation vector (NAV) associated with a communication channel, according to an embodiment.

FIG. 4 is a flow diagram of an example method 400 of updating a NAV, according to an embodiment. In an embodiment, the method 400 is implemented by the network interface device 162 (FIG. 1) and uses CSMA/CA- and CCA-related components illustrated in FIG. 2. Thus, the method 400 is described with reference to FIGS. 1 and 2 for ease of explanation. In other embodiments, however, the method 400 is implemented by another suitable network interface device. Similarly, in some embodiments, the network interface device 162 (FIG. 1) and the CSMA/CA- and CCA-related components illustrated in FIG. 2 do not implement the method 400.

In an embodiment, the method 400 is utilized with a network interface device that maintains a NAV in connection with transmissions on the primary channel and does not maintain any NAVs for any secondary channels. In another embodiment, the method 400 is utilized with a network interface device that maintains a NAV for a primary channel and another NAV for an alternative primary channel.

At block 404, a PHY data unit is received by a communication device (e.g., the client station 154-1 or another suitable communication device) via a communication channel. For example, the network interface device 162 receives the PHY data unit via the antenna(s) 178. In an embodiment, the communication channel is a component channel. In another embodiment, the communication channel is a composite channel that includes at least one secondary channel (e.g., the composite channel includes a primary channel and one or more secondary channels, the composite channel includes two or more secondary channels, etc.).

At block 408, the network interface device 162 determines whether the communication channel via which the PHY data unit was received at block 404 overlaps in frequency with a primary channel. In an embodiment, block 408 includes the controller 228 determining whether the communication channel via which the PHY data unit was received at block 404 overlaps in frequency with a primary channel.

If the network interface device 162 determines that the communication channel does not overlap in frequency with a primary channel, the flow ends. On the other hand, if the network interface device 162 determines, at block 408, that the communication channel does overlap in frequency with a primary channel, the flow proceeds to block 412.

At block 412, the network interface device 162 determines whether duration information in a header of the PHY data unit received at block 404 indicates a longer time period than a current value of the NAV. If the network interface device 162 determines that the duration information in the header of the PHY data unit does not indicate a longer time period than the current value of the NAV, the flow ends. On the other hand, if the network interface device 162 determines, at block 412, that the duration information in the header of the PHY data unit does indicate a longer time period than the current value of the NAV, the flow proceeds to block 416. In an embodiment, block 412 includes the controller 228 determining whether duration information in the header of the PHY data unit indicates a longer time period than a current value of the NAV.

At block 416, the network interface device 162 sets the NAV in connection with receiving the PHY data unit at block 404, where the NAV indicates that another communication device is using a communication medium. In an embodiment, block 416 includes setting a timer of the NAV using duration information included in the header of the PHY data unit. In an embodiment, block 416 includes setting a channel parameter of the NAV to indicate the communication channel via which the data unit was received at block 404. In an embodiment, block 416 includes the controller 228 setting the NAV 224.

In an embodiment in which the network interface device 162 maintains a NAV for a primary channel and another NAV for an alternative primary channel, blocks 408, 412, and 416 are repeated in connection with the NAV for the alternative primary channel.

Figure 5:
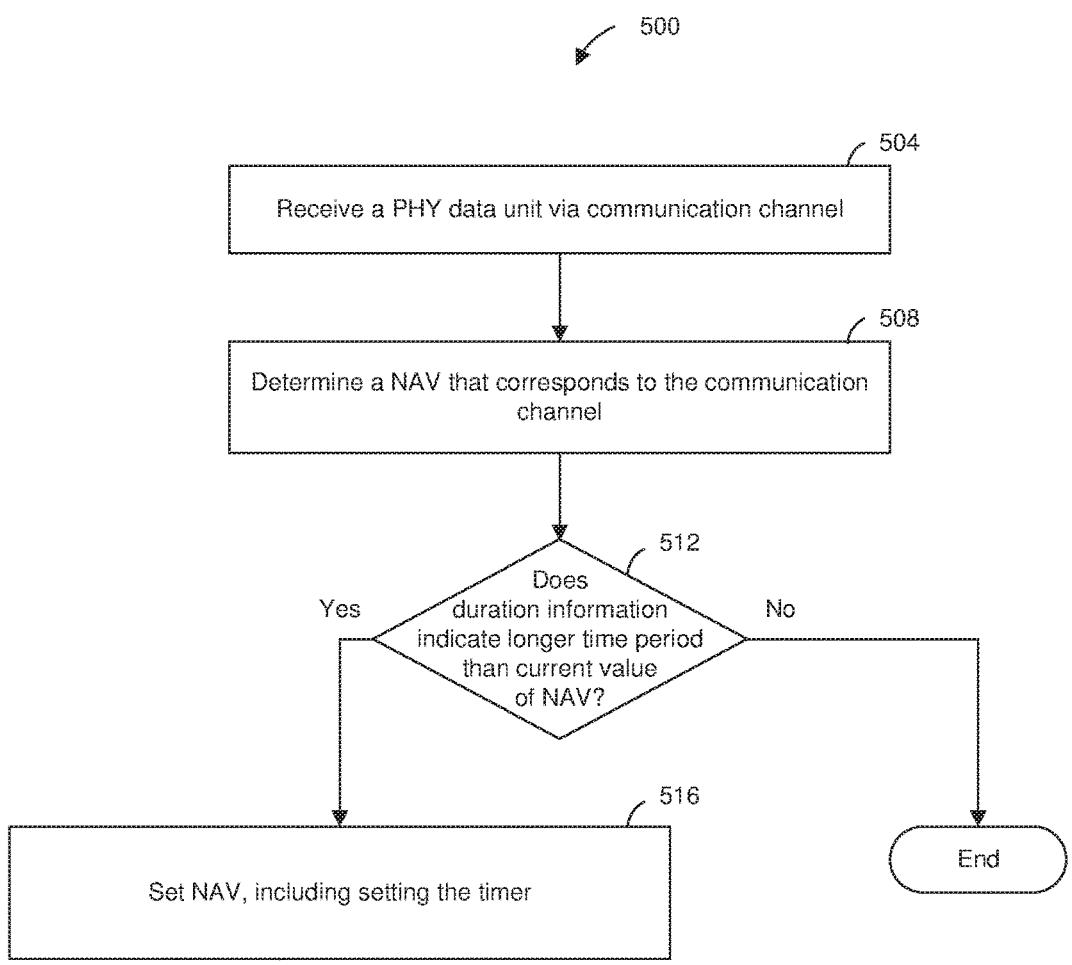
FIG. 5 is a flow diagram of another example method for setting a NAV associated with a communication channel, according to another embodiment.

FIG. 5 is a flow diagram of an example method 500 of updating NAVs, according to an embodiment. In an embodiment, the method 500 is implemented by the network interface device 162 (FIG. 1) and uses CSMA/CA- and CCA-related components illustrated in FIG. 2. Thus, the method 500 is described with reference to FIGS. 1 and 2 for ease of explanation. In other embodiments, however, the method 500 is implemented by another suitable network interface device. Similarly, in some embodiments, the network interface device 162 (FIG. 1) and the CSMA/CA- and CCA-related components illustrated in FIG. 2 do not implement the method 500.

In an embodiment, the method 500 is utilized with a network interface device that maintains a set of multiple NAVs corresponding to respective communication channels that include multiple different component channels and multiple different composite channels comprising various combinations of component channels. In other words, each of at least some of the NAVs in the set corresponds to a different communication channel, according to an embodiment.

At block 504, a PHY data unit is received by a communication device (e.g., the client station 154-1 or another suitable communication device) via a communication channel. For example, the network interface device 162 receives the PHY data unit via the antenna(s) 178. In an embodiment, the communication channel is a component channel. In another embodiment, the communication channel is a composite channel that includes at least one secondary channel (e.g., the composite channel includes a primary channel and one or more secondary channels, the composite channel includes two or more secondary channels, etc.).

At block 508, the network interface device 162 determines a NAV that corresponds to the communication channel via which the PHY data unit was received at block 504 overlaps in frequency with a primary channel. In an embodiment, block 508 includes the controller 228 determining the communication channel via which the PHY data unit was received at block 404, and selecting a NAV, from a set of multiple NAVs, that corresponds to the communication channel.

At block 512, the network interface device 162 determines whether duration information in a header of the PHY data unit received at block 504 indicates a longer time period than a current value of the determined NAV. If the network interface device 162 determines that the duration information in the header of the PHY data unit does not indicate a longer time period than the current value of the NAV, the flow ends. On the other hand, if the network interface device 162 determines, at block 512, that the duration information in the header of the PHY data unit does indicate a longer time period than the current value of the NAV, the flow proceeds to block 516. In an embodiment, block 512 includes the controller 228 determining whether duration information in the header of the PHY data unit indicates a longer time period than a current value of the NAV.

At block 516, the network interface device 162 sets the determined NAV in connection with receiving the PHY data unit at block 504, where the NAV indicates that another communication device is using a communication medium. In an embodiment, block 516 includes setting a timer of the determined NAV using duration information included in the header of the PHY data unit. In an embodiment, block 516 includes the controller 228 setting the determined NAV 224.

FIG. 6 is a flow diagram of an example method 600 for performing a backoff operation, according to an embodiment. In an embodiment, the method 600 is implemented by the network interface device 162 (FIG. 1) and uses CSMA/CA- and CCA-related components illustrated in FIG. 2. Thus, the method 600 is described with reference to FIGS. 1 and 2 for ease of explanation. In other embodiments, however, the method 600 is implemented by another suitable network interface device. Similarly, in some embodiments, the network interface device 162 (FIG. 1) and the CSMA/CA- and CCA-related components illustrated in FIG. 2 do not implement the method 600.

In an embodiment, the method 600 is utilized with a network interface device that maintains a single backoff timer 232. In another embodiment, the method 600 is utilized with a network interface device that maintains multiple backoff timers 232.

In some embodiments, the method 600 is utilized in combination with any of the methods for setting a NAV and using NAVs to determine whether a channel is idle described above. In other embodiments, the method 600 is utilized in connection with other suitable techniques for setting NAVs and/or using NAVs to determine whether a channel is idle.

At block 604, the network interface device uses the backoff timer 232 in connection with determining whether the communication device 154-1 can transmit on the primary channel (e.g., can transmit on the primary channel only in one embodiment, can transmit on a composite channel that includes the primary channel in another embodiment). In an embodiment, block 604 includes decrementing the backoff timer 232 one or more times from an initial value to an intermediate value in response to determining that the primary channel (or a composite channel that includes the primary channel) was idle during one or more time slots. In an embodiment, block 604 includes decrementing the backoff timer 232 one or more times from an initial value to an intermediate value in response to determining only that the primary channel was idle during one or more time slots. In another embodiment, block 604 includes decrementing the backoff timer 232 one or more times from an initial value to an intermediate value in response to determining that a composite channel that includes the primary channel was idle during one or more time slots. In an embodiment, block 604 includes the controller 228 decrementing the backoff timer 232 in response to the CCA busy/idle signal from the PHY processor 170 indicating that the primary channel is idle during one or more time slots.

At block 608, the network interface device determines, subsequent to block 604, to attempt to transmit on a communication channel different than the primary channel. In an embodiment, the communication channel different than the primary channel is different than a channel that was monitored at block 604 for determining whether to decrement the backoff counter. In an embodiment, the communication channel different than the primary channel does not include the primary channel. In another embodiment, the communication channel different than the primary channel is a composite channel that includes the primary channel and one or more secondary channels. In an embodiment, block 608 includes determining to attempt to transmit on the communication channel different than the primary channel in response to an allocation of the different channel to the client station 154-1 by the AP 114, where an indication of the allocations is communicated to the client station 154-1 by the AP 114.

At block 612, responsive to the determination at block 608, the network interface device uses the backoff timer 232 in connection with determining whether the communication device 154-1 can transmit on the channel that is different than the primary channel. In an embodiment, block 612 includes continuing the backoff timer 232 from a timer value that was reached while using the backoff timer 232 to determine whether the communication device 154-1 could transmit on the primary channel rather than resetting the backoff timer 232 to a randomly or pseudorandomly chosen value. In an embodiment, block 612 includes continuing the backoff timer 232 from the intermediate value reached while using the backoff timer 232 to determine whether the communication device 154-1 could transmit on the primary channel. In an embodiment, block 612 includes the controller 228 continuing the backoff timer 232 from a timer value that was reached while using the backoff timer 232 to determine whether the communication device 154-1 could transmit on the primary channel rather than resetting the backoff timer 232 to a randomly or pseudorandomly chosen value.

FIG. 7 is a flow diagram of another example method 700 for performing a backoff operation, according to an embodiment. In an embodiment, the method 700 is implemented by the network interface device 162 (FIG. 1) and uses CSMA/CA- and CCA-related components illustrated in FIG. 2. Thus, the method 700 is described with reference to FIGS. 1 and 2 for ease of explanation. In other embodiments, however, the method 700 is implemented by another suitable network interface device. Similarly, in some embodiments, the network interface device 162 (FIG. 1) and the CSMA/CA- and CCA-related components illustrated in FIG. 2 do not implement the method 700.

In an embodiment, the method 700 is utilized with a network interface device that maintains a single backoff timer 232. In another embodiment, the method 700 is utilized with a network interface device that maintains multiple backoff timers 232.

In some embodiments, the method 700 is utilized in combination with any of the methods for setting a NAV and using NAVs to determine whether a channel is idle described above. In other embodiments, the method 700 is utilized in connection with other suitable techniques for setting NAVs and/or using NAVs to determine whether a channel is idle.

At block 704, the network interface device uses a first backoff timer 232 in connection with determining whether the communication device 154-1 can transmit on the primary channel (e.g., can transmit on the primary channel only in one embodiment, can transmit on a composite channel that includes the primary channel in another embodiment). In an embodiment, block 704 includes decrementing the first backoff timer 232 one or more times from an initial value to an intermediate value in response to determining that the primary channel (or a composite channel that includes the primary channel) was idle during one or more time slots. In an embodiment, block 704 includes the controller 228 decrementing the first backoff timer 232 in response to the CCA busy/idle signal from the PHY processor 170 indicating that the primary channel is idle during one or more time slots.

At block 708, the network interface device determines, subsequent to block 704, to attempt to transmit on a communication channel different than the primary channel. In an embodiment, the communication channel different than the primary channel is different than a channel that was monitored at block 704 for determining whether to decrement the first backoff counter. In an embodiment, the communication channel different than the primary channel does not include the primary channel. In another embodiment, the communication channel different than the primary channel is a composite channel that includes the primary channel and one or more secondary channels. In an embodiment, block 708 includes determining to attempt to transmit on the communication channel different than the primary channel in response to an allocation of the different channel to the client station 154-1 by the AP 114, where an indication of the allocations is communicated to the client station 154-1 by the AP 114.

At block 712, responsive to the determination at block 708, the network interface device sets a second backoff timer 232 in connection with determining whether the communication device 154-1 can transmit on the channel that is different than the primary channel. In an embodiment, block 712 includes randomly or pseudorandomly choosing an initial value for the second backoff timer from a range of initial values. In an embodiment, the range of initial values is [0, CW], where CW is a contention window parameter, where the initial value and CW are in units of a slots, and where each slot corresponds to a suitable time period. For example, the IEEE 802.11 Standard defines slot times of 20 microseconds (IEEE 802.11b) and 9 microseconds (IEEE 802.11a, 11n, and 11ac), where different slot times are used for different versions of the protocol. In an embodiment, CW is initially set to a minimum value CWmin. However, after each failed transmission attempt (e.g., failure to receive an acknowledgment of the transmission), the value of CW is approximately doubled with an upper bound of CWmax. The parameters CWmin and CWmax are also in units of slots.

In an embodiment, the parameters used for setting the second backoff timer 232 (e.g., CWmin and CWmax, or other suitable parameters) are the same parameters used for setting the first backoff timer. In another embodiment, the parameters used for setting the second backoff timer 232 (e.g., CWmin and CWmax, or other suitable parameters) are different than the same parameters used for setting the first backoff timer.

In an embodiment, the second backoff timer is a different physical backoff timer than the first backoff timer; thus, the MAC processor 166 includes multiple physical backoff timers 232. In another embodiment, the second backoff timer is implemented with a same physical backoff timer used to implement the first backoff timer. For example, block 716 may include resetting the physical backoff timer that was previously used (e.g., at block 704) to implement the first backoff timer.

After block 712, the network interface device uses the second backoff timer 232 in connection with determining whether the communication device 154-1 can transmit on the channel that is different than the primary channel. In an embodiment, using the second backoff timer 232 includes decrementing the second backoff timer 232 one or more times from in response to determining that the channel that is different than the primary channel is idle during one or more time slots. In an embodiment, using the second backoff timer 232 includes the controller 228 decrementing the second backoff timer 232 in response to the CCA busy/idle signal from the PHY processor 170 indicating that the channel that is different than the primary channel is idle during one or more time slots.

In an embodiment, the MAC processor (e.g., the MAC processor 126 or the MAC processor 166) uses two backoff counters: the first backoff counter and the second backoff counter. For example, the first backoff counter is used for communications on a communication channel consisting of the primary channel, and the second backoff counter is used for communications on any communication channel that comprises at least one secondary channel. In such an embodiment, block 712 is performed when the MAC processor determines (at block 708) to switch from using the primary channel to using any secondary channel. In such an embodiment, the same second backoff counter is used (the second backoff counter is not reset) when the MAC processor determines to switch between different channels that do not consist of the primary channel.

In another embodiment in which the MAC processor uses two backoff counters, the MAC processor (e.g., the MAC processor 126 or the MAC processor 166) uses the first backoff counter for communications on a communication channel that includes the primary channel, and uses the second backoff counter for communications on any communication channel that i) comprises at least one secondary channel and ii) excludes the primary channel. In such an embodiment, block 712 is not performed when the MAC processor determines (at block 708) to use a composite channel that includes the primary channel. In such an embodiment, the same second backoff counter is used (e.g., the second backoff counter is not reset) when the MAC processor determines to switch between different channels that do not include the primary channel.

In another embodiment, the MAC processor (e.g., the MAC processor 126 or the MAC processor 166) uses a different backoff counter for each possible channel (e.g., e.g., for each component channel and for each possible composite channel). As an illustrative example, in a system that uses four component channels (one primary channel and three secondary channels) in which two or more adjacent channels can be combined (or bonded) as a composite channel, the MAC processor uses ten different backoff counters for ten different possible channels. In such an embodiment, the first backoff counter discussed with respect to FIG. 7 corresponds to a channel that consist of the primary channel. In such an embodiment, a different backoff counter is used (e.g., a backoff counter corresponding to the new channel is set) any time the MAC processor determines to switch between different channels.

In another embodiment, the MAC processor (e.g., the MAC processor 126 or the MAC processor 166) uses a different backoff counter for i) the primary channel, and ii) one or more alternate primary channels. As an illustrative example, in a system that uses four component channels (one primary channel and three secondary channels) in which each of the secondary channels can be designated as an alternate primary channel, the MAC processor uses four different backoff counters: one for the primary channel, and three for three different possible alternate primary channels. In such an embodiment, the first backoff counter discussed with respect to FIG. 7 corresponds to any channel that uses primary channel, and the second backoff counter discussed with respect to FIG. 7 corresponds to a channel that uses an alternate primary channel. In such an embodiment, a different backoff counter is used (e.g., a backoff counter corresponding to the new channel is set) any time the MAC processor determines to switch i) between a first channel that uses the primary channel to a second channel that uses an alternate primary channel, or ii) between a first channel that uses a first alternate primary channel to a second channel that uses a second alternate primary channel.

As discussed above, different backoff counters may be implemented using a single physical backoff counter or different physical backoff counters.

FIG. 8 is a flow diagram of an example method 800 for performing a backoff operation, according to an embodiment. In an embodiment, the method 800 is implemented by the network interface device 162 (FIG. 1) and uses CSMA/CA- and CCA-related components illustrated in FIG. 2. Thus, the method 800 is described with reference to FIGS. 1 and 2 for ease of explanation. In other embodiments, however, the method 800 is implemented by another suitable network interface device. Similarly, in some embodiments, the network interface device 162 (FIG. 1) and the CSMA/CA- and CCA-related components illustrated in FIG. 2 do not implement the method 800.

In an embodiment, the method 800 is utilized with a network interface device that uses multiple backoff timers 232 for different communication channels, including a first backoff timer corresponding to a first communication channel and a second backoff timer corresponding to a second communication channel. In an embodiment, the network interface device uses a respective backoff timer 232 for each communication channel (e.g., each component channel and each composite channel). In another embodiment, the network interface device uses a first backoff timer 232 for the primary channel and a second backoff timer 232 for all other communication channels (e.g., all component secondary channels and all composite channels). In another embodiment, the network interface device uses a respective backoff timer 232 for the primary channel and each alternate primary channel.

In some embodiments, the method 800 is utilized in combination with any of the methods for setting a NAV and using NAVs to determine whether a channel is idle described above. In other embodiments, the method 800 is utilized in connection with other suitable techniques for setting NAVs and/or using NAVs to determine whether a channel is idle.

At block 804, the network interface device uses the first backoff timer 232 in connection with determining whether the communication device 154-1 can transmit on the first communication channel. In an embodiment, block 804 includes decrementing the first backoff timer 232 one or more times from an initial value to an intermediate value in response to determining that the first communication channel was idle during one or more time slots. In an embodiment, block 804 includes decrementing the first backoff timer 232 one or more times from an initial value to an intermediate value in response to determining only that a primary channel included within the first communication channel (or an alternate primary channel included within the first communication channel) was idle during one or more time slots. In an embodiment, block 804 includes the controller 228 decrementing the first backoff timer 232 in response to the CCA busy/idle signal from the PHY processor 170 indicating that the first communication channel (or a primary component channel within the first communication channel, or an alternate primary component channel within the first communication channel) is idle during one or more time slots.

At block 808, the network interface device determines, subsequent to block 804, to attempt to transmit on a second communication channel different than the first communication channel. In an embodiment, the second communication channel. In an embodiment, block 808 includes determining to attempt to transmit on the second communication channel in response to an allocation of the second communication channel to the client station 154-1 by the AP 114, where an indication of the allocation is communicated to the client station 154-1 by the AP 114.

At block 812, the network interface device determines whether the second communication channel corresponds to using a second backoff counter different than the first backoff counter. In an embodiment, block 812 includes the controller 228 determining whether the second communication channel corresponds to using a second backoff counter different than the first backoff counter. In an embodiment in which the network interface device uses a respective backoff timer 232 for each communication channel (e.g., each component channel and each composite channel), block 812 includes determining which backoff timer 232 corresponds to the second communication channel. In another embodiment in which the network interface device uses a first backoff timer 232 for the primary channel and a second backoff timer 232 for all other communication channels (e.g., all component secondary channels and all composite channels), block 812 includes determining whether the second communication channel is the primary channel. In another embodiment in which the network interface device uses a respective backoff timer 232 for the primary channel and each alternate primary channel, block 812 includes determining whether the second communication channel overlaps with the primary channel or an alternate primary channel.

If the network interface device determines at block 812 that the second communication channel corresponds to using the first backoff counter, the flow proceeds to block 816.

At block 816, responsive to the determination at block 812 that the second communication channel corresponds to using the first backoff counter, the network interface device uses the first backoff timer 232 in connection with determining whether the communication device 154-1 can transmit on the second communication channel. In an embodiment, block 816 includes continuing the first backoff timer 232 from a timer value that was reached while using the first backoff timer 232 to determine whether the communication device 154-1 could transmit on the first communication channel rather than resetting the first backoff timer 232 to a randomly or pseudorandomly chosen value. In an embodiment, block 816 includes continuing the first backoff timer 232 from the intermediate value reached while using the backoff timer 232 to determine whether the communication device 154-1 could transmit on the first communication channel. In an embodiment, block 816 includes the controller 228 continuing the first backoff timer 232 from a timer value that was reached while using the first backoff timer 232 to determine whether the communication device 154-1 could transmit on the first communication channel rather than resetting the backoff timer 232 to a randomly or pseudorandomly chosen value. In an embodiment, block 816 includes continuing the first backoff timer 232 from the intermediate value reached while using the backoff timer 232 to determine whether the communication device 154-1 could transmit on the first communication channel. For example, the controller 228 continues the first backoff timer 232 from the intermediate value reached during block 804.

On the other hand, if the network interface device determines, at block 812, that the second communication channel corresponds to using the second backoff counter, the flow proceeds to block 820. At block 820, responsive to the determination at block 812 that the second communication channel corresponds to using the second backoff counter, the network interface device sets the second backoff timer 232 in connection with determining whether the communication device 154-1 can transmit on the second communication channel. In an embodiment, block 820 includes randomly or pseudorandomly choosing an initial value for the second backoff timer from a range of initial values. In an embodiment, the range of initial values is [1, CW], such as described above.

In an embodiment, the parameters used for setting the second backoff timer 232 (e.g., CWmin and CWmax, or other suitable parameters) are the same parameters used for setting the first backoff timer. In another embodiment, the parameters used for setting the second backoff timer 232 (e.g., CWmin and CWmax, or other suitable parameters) are different than the same parameters used for setting the first backoff timer.

In an embodiment, the second backoff timer is a different physical backoff timer than the first backoff timer. In another embodiment, the second backoff timer is implemented with a same physical backoff timer used to implement the first backoff timer. For example, block 820 may include resetting the physical backoff timer that was previously used (e.g., at block 804) to implement the first backoff timer.

In an embodiment in which the network interface device uses more than two backoff timers 232, block 820 includes selecting one of the backoff timers 232 as the second backoff timer. In various embodiments, selecting one of the backoff timers 232 as the second backoff timer includes one or more of i) selecting the backoff timer 232 that corresponds to the second communication channel, ii) determining whether the second communication channel is the primary channel, iii) determining whether the second communication channel overlaps with the primary channel, iv) determining whether the second communication channel overlaps with an alternate primary channel, etc.

After blocks 816 and 820, the network interface device uses the first backoff timer or the second backoff timer in connection with determining whether the communication device 154-1 can transmit on the second communication channel.

Figure 9:
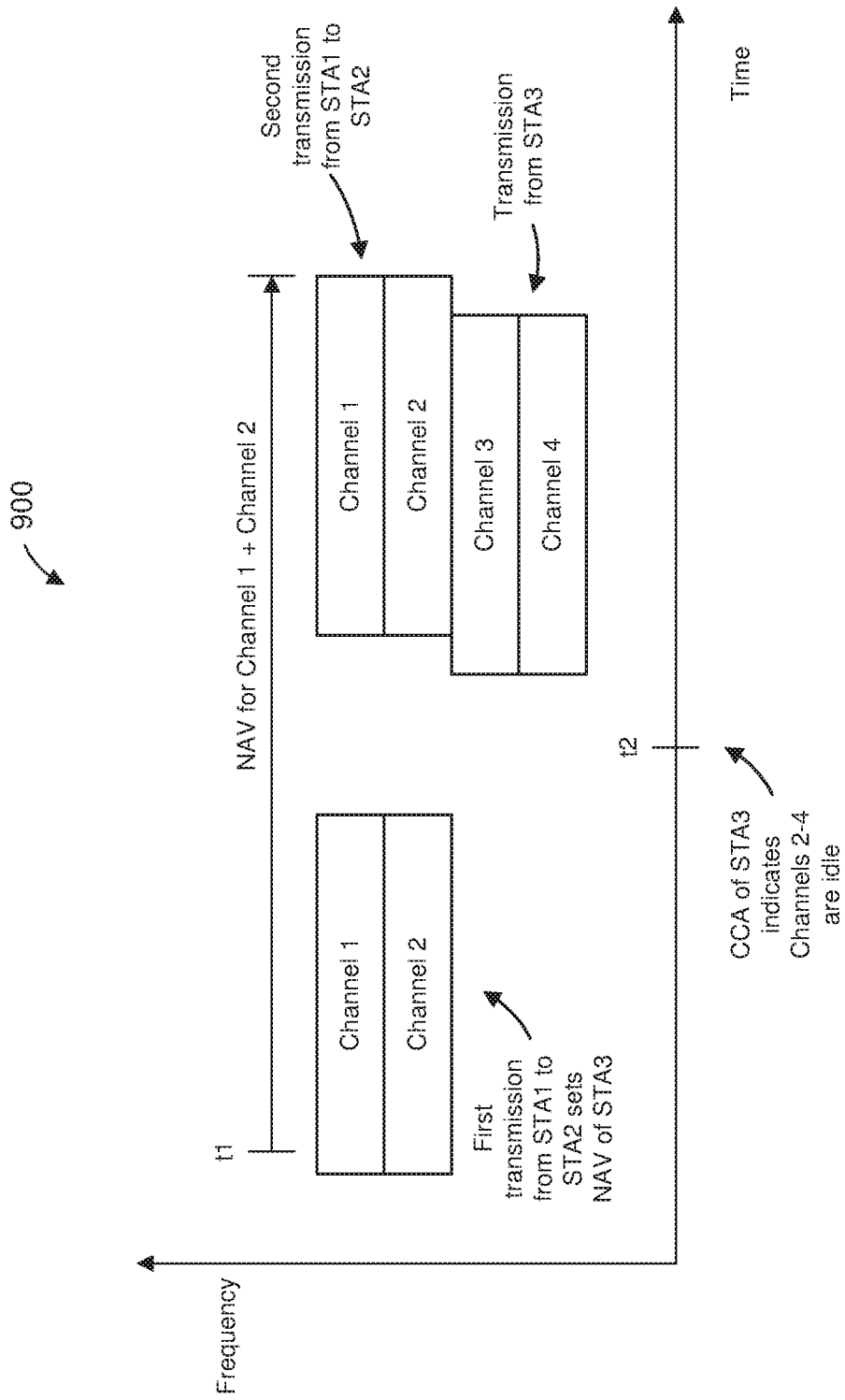
FIG. 9 is a timing diagram illustrating an example set of transmissions in a network such as the network of FIG. 1, according to an embodiment.

FIG. 9 is a timing diagram 200 illustrating an example set of transmissions in a network such as the network 110 of FIG. 1. A first transmission from a first client station (STA1) to a second client station (STA2) is also received by a third client station (STA3), which prompts STA3 at time t1 to set a NAV corresponding to a composite channel (Channel 1+Channel 2) via which the transmission was received, for example using techniques such as described above. Additionally, STA3 has been given permission (e.g., by the AP 114) to transmit on a composite channel comprising Channels 2-4). Subsequently, at time t2, a CCA process performed at STA3 indicates that Channels 2-4 are idle. However, the NAV of STA3 corresponding to the composite channel (Channel 1+Channel 2) is non-zero at t2. Thus, STA3 determines using the NAV that Channel 2 is busy while Channels 3 and 4 are idle. Accordingly, STA3 determines to transmit on Channels 3 and 4.

Figure 10:
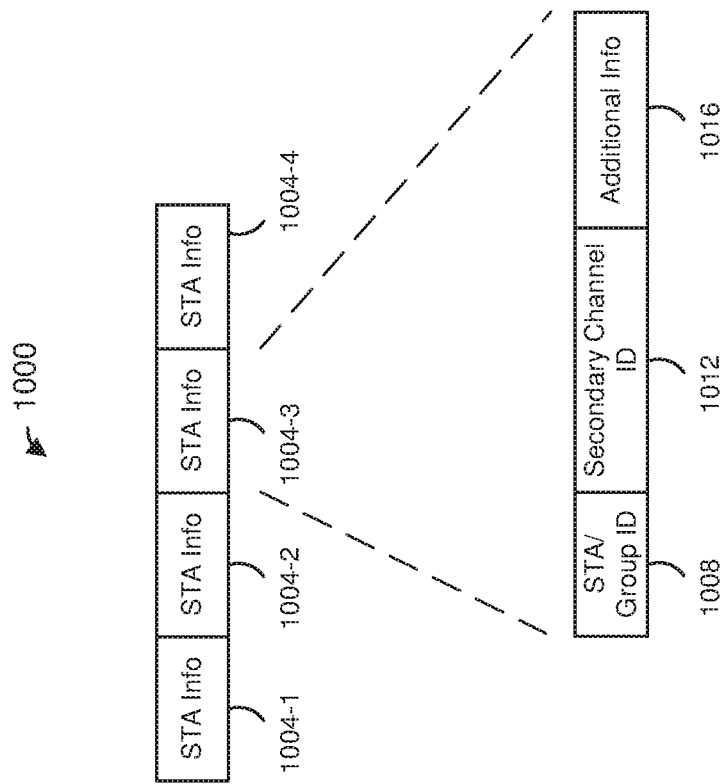
FIG. 10 is a diagram of an example information element or field that an access point uses to convey secondary channel allocation information to client stations 154, according to an embodiment.

As discussed above, the AP 114 determines secondary channel allocations and communicates the secondary channel allocations to the client stations 154, according to some embodiments. FIG. 10 is a diagram of an example secondary channel allocation information element or field 1000 that the AP 114 transmits to the client stations 154, according to an embodiment. The secondary channel allocation information element or field 1000 may be included in a beacon frame, a grant frame, a generic control frame, a control trailer which is appended to a control frame, etc., according to various embodiments.

The secondary channel allocation information element or field 1000 includes one or more station information fields 1004. In an embodiment, each station information field 1004 includes a station/group identifier (ID) field 1008. The station/group ID field 1008 may be populated with a station ID or a group ID to indicate an intended station or group of stations to which the station information field 1004 corresponds. In an embodiment, a predetermined value in the station/group ID field 1008 indicates all associated stations.

In an embodiment, each station information field 1004 also includes a secondary channel ID field 1012 that indicates a secondary channel being allocated to the station or group of stations indicated by the station/group ID field 1008. In an embodiment, the secondary channel ID field 1012 may indicate a single secondary component channel. In another embodiment, the secondary channel ID field 1012 additionally or alternatively may indicate a group of secondary component channels that are permitted to be bonded together and used as a composite channel.

In an embodiment, the station information field 1004 may also include a field 1016 for conveying additional information regarding the secondary channel(s) indicated by the secondary channel ID field 1012, according to an embodiment. For example, the field 1016 may include a sub-field that indicates one or more traffic types that are permitted to be transmitted in the secondary channel(s) indicated by the secondary channel ID field 1012. As another example, the field 1016 may include a sub-field that indicates which secondary channel is designated as an alternate primary channel. As yet another example, the field 1016 may include a sub-field that indicates a maximum bandwidth that the station(s) is/are permitted to use when transmitting using any secondary channel indicated by the secondary channel ID field 1012. As still another example, the field 1016 may include a sub-field that indicates station(s) is/are permitted to use opportunistic channel bonding when transmitting using any secondary channel indicated by the secondary channel ID field 1012. For example, a station may use CSMA/CA techniques such as described above, or other suitable CSMA/CA techniques, to determine a set of multiple secondary channels (from among multiple secondary channels indicated by the secondary channel ID field 1012) to use as a composite (bonded) channel, in an embodiment.

In an embodiment, the MAC processor 126 of the AP 114 is configured to generate the secondary channel allocation information element or field 1000 and generate a beacon frame, a grant frame, a generic control frame, a control frame with an appended control trailer, etc., which includes the secondary channel allocation information element or field 1000. The PHY processor 130 is configured to generate a PHY data unit that includes the beacon frame, the grant frame, the generic control frame, the control frame with the appended control trailer, etc., and then provide the PHY data unit to the antenna(s) 138.

In an embodiment, the MAC processor 166 of the client station 154 is configured to use information in the secondary channel allocation information element or field 1000 which was included in a received PHY data unit. For example, the MAC processor 166 may use the station/group ID field 1008 and the secondary channel ID field 1012 to determine that the client station 154 is permitted to use one or more secondary channels. As another example, the MAC processor 166 may use information in a sub-field of the field 1016 that indicates one or more traffic types that are permitted to be transmitted in the secondary channel(s) indicated by the secondary channel ID field 1012. As yet another example, the MAC processor 166 may use information in a sub-field of the field 1016 that indicates which secondary channel is designated as an alternate primary channel. As still another example, the MAC processor 166 may use information in a sub-field of the field 1016 that indicates a maximum bandwidth that the client station 154 is permitted to use when transmitting using any secondary channel indicated by the secondary channel ID field 1012. As yet another example, the MAC processor 166 may use information in a sub-field of the field 1016 that indicates the client station 154 is permitted to use opportunistic channel bonding when transmitting using any secondary channel indicated by the secondary channel ID field 1012. For example, the MAC processor 166 may use CSMA/CA techniques such as described above, or other suitable CSMA/CA techniques, to determine a set of multiple secondary channels (from among multiple secondary channels indicated by the secondary channel ID field 1012) to use as a composite (bonded) channel, in an embodiment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for determining whether a communication device is permitted to transmit via a first communication channel, comprising:
   receiving, at a communication device, a first physical layer (PHY) data unit via a second communication channel, the first PHY data unit having a header;
   setting, at the communication device, a network allocation vector (NAV) corresponding to the second communication channel, the NAV having a NAV timer, including setting the NAV timer using duration information included in the header of the first PHY data unit, wherein the NAV timer indicates whether another communication device is using a communication medium;
   determining, at the communication device, when the communication device is permitted to transmit via the first communication channel, including:
      determining, at the communication device, whether the second communication channel overlaps in frequency with the first communication channel,
      when the communication device determines that the second communication channel overlaps the first communication channel, determining that the communication device is not permitted to transmit via the first communication channel in response to determining that the NAV timer is not zero, and
      when the communication device determines that the second communication channel does not overlap the first communication channel, determining that the communication device is permitted to transmit via the second communication channel even when the NAV timer is not zero; and
   transmitting, with the communication device, a second PHY data unit via the first communication channel in response to determining that the communication device is permitted to transmit via the first communication channel.

2. The method of claim 1, wherein setting the NAV corresponding to the second communication channel comprises setting a channel parameter corresponding to the NAV to indicate the second communication channel.

3. The method of claim 1, further comprising:
   selecting, at the communication device, the NAV corresponding to the second communication channel from a plurality of NAVs respectively corresponding to different communication channels.

4. The method of claim 1, further comprising:
   receiving, at the communication device, a third PHY data unit, the third PHY data unit having a header;
   determining, at the communication device, whether a communication channel via which the third PHY data unit was received overlaps in frequency with the second communication channel;
   at least when the communication device determines that the communication channel via which the third PHY data unit was received overlaps in frequency with the second communication channel, determining, at the communication device, whether duration information in the header of the third PHY data unit indicates a time period that is longer than a time period corresponding to a current value of the NAV timer; and
   in response to the communication device determining i) that the communication channel via which the third PHY data unit was received overlaps in frequency with the second communication channel, and ii) that duration information in the header of the third PHY data unit indicates a time period that is longer than the time period corresponding to the current value of the NAV timer, updating, at the communication device, the NAV timer using the duration information in the header of the third PHY data unit.

5. The method of claim 1, further comprising:
   receiving, at the communication device, a third PHY data unit, the third PHY data unit having a header;
   selecting, at the communication device, a NAV that corresponds to a communication channel via which the third PHY data unit was received from a plurality of NAVs respectively corresponding to different communication channels;
   determining, at the communication device, whether duration information in the header of the third PHY data unit indicates a time period that is longer than a time period corresponding to a current value of a NAV timer of the selected NAV; and in response to determining that duration information in the header of the third PHY data unit indicates a time period that is longer than the time period corresponding to the current value of the NAV timer of the selected NAV, setting, at the communication device, the NAV timer of the selected NAV using the duration information in the header of the third PHY data unit.

6. The method of claim 1, wherein:
the first communication channel includes a secondary communication channel and does not include a primary communication channel, the primary communication channel and the secondary communication channel among a set of communication channels utilized by a communication system;
determining when the communication device is permitted to transmit via the first communication channel further comprises using, at the communication device, a backoff timer corresponding to the primary channel to determine when the communication device is permitted to transmit via the first communication channel.

7. The method of claim 1, wherein:
the first communication channel includes a secondary communication channel and does not include a primary communication channel, the primary communication channel and the secondary communication channel among a set of communication channels utilized by a communication system;
the method further comprises using, at the communication device, a first backoff timer in connection with determining when the communication device is permitted to transmit via the primary communication channel; and
determining when the communication device is permitted to transmit via the first communication channel further comprises:
using a second backoff timer different than the first backoff timer to determine when the communication device is permitted to transmit via the first communication channel.

8. The method of claim 1, wherein:
the method further comprises using, at the communication device, a first backoff timer in connection with determining when the communication device is permitted to transmit via a third communication channel;
the first backoff timer corresponds to the third communication channel;
determining when the communication device is permitted to transmit via the first communication channel further comprises:
using a second backoff timer different than the first backoff timer to determine when the communication device is permitted to transmit via the first communication channel; and
the second backoff timer corresponds to the first communication channel.

9. The method of claim 8, wherein:
the third communication channel corresponds to a primary communication channel; and
the first communication channel corresponds to an alternate primary communication channel.

10. The method of claim 1, further comprising:
receiving, at the communication device, a third PHY data unit from an access point, wherein the third PHY data unit includes:

an indication that the communication device is permitted to transmit on the first communication channel, wherein the first communication channel does not include a primary channel.

11. An apparatus, comprising:
a network interface device associated with a communication device, wherein the network interface device includes:
one or more integrated circuits (ICs),
a media access control (MAC) processor implemented on the one or more ICs, and
a physical layer (PHY) processor implemented on the one or more ICs;
wherein the MAC processor includes:
a logic device configured to determine when the communication device is permitted to transmit via a first communication channel, and
a network allocation vector (NAV) corresponding to a second communication channel, the NAV including a NAV timer that indicates whether another communication device is using a communication medium;
wherein the logic device is configured to:
in response to the communication device receiving a first physical layer (PHY) data unit via the second communication channel,
set the NAV corresponding to the second communication channel, including setting the NAV timer using duration information included in a header of the first PHY data unit,
determine whether the second communication channel overlaps in frequency with the first communication channel,
when the logic device determines that the second communication channel overlaps the first communication channel, determine that the communication device is not permitted to transmit via the first communication channel in response to determining that the NAV timer is not zero, and
when the logic device determines that the second communication channel does not overlap the first communication channel, determine that the communication device is permitted to transmit via the second communication channel even when the NAV timer is not zero;
wherein the MAC processor is further configured to prompt the PHY processor to transmit a second PHY data unit via the first communication channel in response to determining that the communication device is permitted to transmit via the first communication channel.

12. The apparatus of claim 11, wherein:
the MAC processor includes a memory device associated with the NAV; and
the logic device is configured to set a channel parameter corresponding to the NAV to indicate the second communication channel.

13. The apparatus of claim 11, wherein:
the MAC processor includes a plurality of NAVs respectively corresponding to different communication channels, each NAV including a respective NAV timer; and
the logic device is configured to select the NAV corresponding to the second communication channel from the plurality of NAVs.

14. The apparatus of claim 13, wherein the logic device is configured to:

select a NAV that corresponds to a communication channel via which a third PHY data unit was received from the plurality of NAVs;

determine whether duration information in a header of the third PHY data unit indicates a time period that is longer than a time period corresponding to a current value of a NAV timer of the selected NAV; and in response to determining that duration information in a header of the third PHY data unit indicates a time period that is longer than the time period corresponding to the current value of the NAV timer of the selected NAV, set the NAV timer of the selected NAV using the duration information in the header of the third PHY data unit.

15. The apparatus of claim 11, wherein the logic device is configured to:

determine whether a communication channel via which the communication device received a third PHY data unit overlaps in frequency with the second communication channel;

at least when the logic device determines that the communication channel via which the third PHY data unit was received overlaps in frequency with the second communication channel, determine whether duration information in the header of the third PHY data unit indicates a time period that is longer than a time period corresponding to a current value of the NAV timer; and in response to the logic device determining i) that the communication channel via which the third PHY data unit was received overlaps in frequency with the second communication channel, and ii) that duration information in a header of the third PHY data unit indicates a time period that is longer than the time period corresponding to the current value of the NAV timer, update the NAV timer using the duration information in the header of the third PHY data unit.

16. The apparatus of claim 11, wherein:

the first communication channel includes a secondary communication channel and does not include a primary communication channel, the primary communication channel and the secondary communication channel among a set of communication channels utilized by a communication system;

the MAC processor includes a backoff timer corresponding to the primary channel; and the logic device is configured to determine use the backoff timer corresponding to the primary channel to determine when the communication device is permitted to transmit via the first communication channel.

17. The apparatus of claim 11, wherein:

the first communication channel includes a secondary communication channel and does not include a primary communication channel, the primary communication channel and the secondary communication channel among a set of communication channels utilized by a communication system;

the MAC processor includes a first backoff timer and a second backoff timer; and the logic device is configured to:
use the first backoff timer in connection with determining when the communication device is permitted to transmit via the primary communication channel, and use the second backoff timer to determine when the communication device is permitted to transmit via the first communication channel.

18. The apparatus of claim 11, wherein:

the MAC processor includes a first backoff timer corresponding to a third communication channel and a second backoff timer corresponding to the first communication channel; and the logic device is configured to:
use first backoff timer in connection with determining when the communication device is permitted to transmit via the third communication channel, use the second backoff timer to determine when the communication device is permitted to transmit via the first communication channel.

19. The apparatus of claim 11, wherein:

the third communication channel corresponds to a primary communication channel; and the first communication channel corresponds to an alternate primary communication channel.

20. The apparatus of claim 11, wherein the MAC processor is configured to:

determine that the communication device is permitted to transmit on the first communication channel based on an indication included in a third PHY data unit received by the communication device from an access point;

wherein the indication in the third PHY data unit indicates that the access point granted permission to the communication device to transmit on the first communication channel, and wherein the first communication channel does not include a primary channel.

* * * * *